United States Patent [19]

McAdams

[11] 3,853,019
[45] Dec. 10, 1974

[54] TRANSMISSION SHIFTING MECHANISM

[75] Inventor: Paul F. McAdams, Saint Joseph, Mich.

[73] Assignee: Clark Equipment Company, Buchanan, Mich.

[22] Filed: Mar. 21, 1973

[21] Appl. No.: 343,568

[52] U.S. Cl............. 74/473 R, 74/473 SW, 74/484
[51] Int. Cl............................................. G05g 9/06
[58] Field of Search.... 74/484, 473 R, 335, 473 SW

[56] References Cited
UNITED STATES PATENTS
2,269,970  1/1942  Bundy et al........................... 74/484
FOREIGN PATENTS OR APPLICATIONS
1,580,141  3/1971  Germany ............................... 74/484

*Primary Examiner*—Samuel Scott
*Assistant Examiner*—F. D. Shoemaker
*Attorney, Agent, or Firm*—Paul H. Gallagher

[57] ABSTRACT

A transmission shifting mechanism having a single lever for (a) shifting to forward, neutral, and reverse, and (b) shifting to different speed ratios, in respectively different planes; in (b) a pawl and ratchet is included and a stop for limiting movement of the lever to an extent corresponding to one speed ratio shifting increment, so that only one such shifting increment can be performed at a time, both in upshifting and downshifting; the shifting lever must be returned to center position after each shifting movement; spring centering means biases, and normally returns, the shifting lever to center position; the shifting mechanism can be shifted to different speed ratios in either forward or reverse condition; the device takes two forms — in one the pawl assumes an active position automatically in response to movement of the shifting lever, and in another, the operator manually moves it to active position.

18 Claims, 10 Drawing Figures

TRANSMISSION SHIFTING MECHANISM

FIELD OF THE INVENTION

The invention resides in the field of a transmission having forward and reverse conditions, and a plurality of speed ratio conditions, and a single shifting lever, or control lever, which is utilized for shifting both to the forward and reverse conditions, and to any of the speed ratio conditions.

OBJECTS OF THE INVENTION

A broad object of the invention is to provide a shifting mechanism, or control mechanism, for a transmission of the foregoing kind, namely, wherein a single shifting lever is utilized for shifting between different speed ratios, which includes a novel arrangement for preventing skipping of speed ratios.

Another and broad object of the invention is to provide a device of the foregoing character wherein the shifting lever for shifting the speed ratios of the transmission can be moved, in any one maneuver, only a distance equivalent to an increment for shifting between consecutive and adjacent speed ratios, after which it is necessary to move the shifting lever back to a center position before it is possible to shift again to an additional speed ratio.

Another object is to provide a device of the character just previously referred to which includes a pawl on the lever and a ratchet on the shaft in the shifting column and wherein the pawl is moved to an active position to accomplish the shifting result.

Still another object is to provide a device of the character just previously referred to wherein the pawl moves to active position automatically in response to moving the shifting lever.

A further object is to provide a device of the character referred to above generally, but forming another form of the invention from that just previously referred to, and wherein the pawl is moved to active position manually.

Still a further object of the invention is to provide a device of the foregoing character wherein in either of the forms, the pawl operates in connection with the ratchet in the same manner both in an upshifting and downshifting function.

An additional object is to provide a device of the foregoing character, including any of the features mentioned therein, wherein the transmission can be shifted from forward to reverse and vice versa, in any speed ratio in which the transmission happens to be in according to a previous manipulation, without returning the shift lever to a center position.

A yet further object is to provide a device of the foregoing character wherein shifting can be made to different speed ratios whether the transmission is in forward or reverse condition.

Still another object is to provide a device of the general nature referred to above that can function as a sequential operating mechanism, similar to a power device, e.g., a jack.

DESCRIPTION OF A PREFERRED EMBODIMENT:

Figure 1:
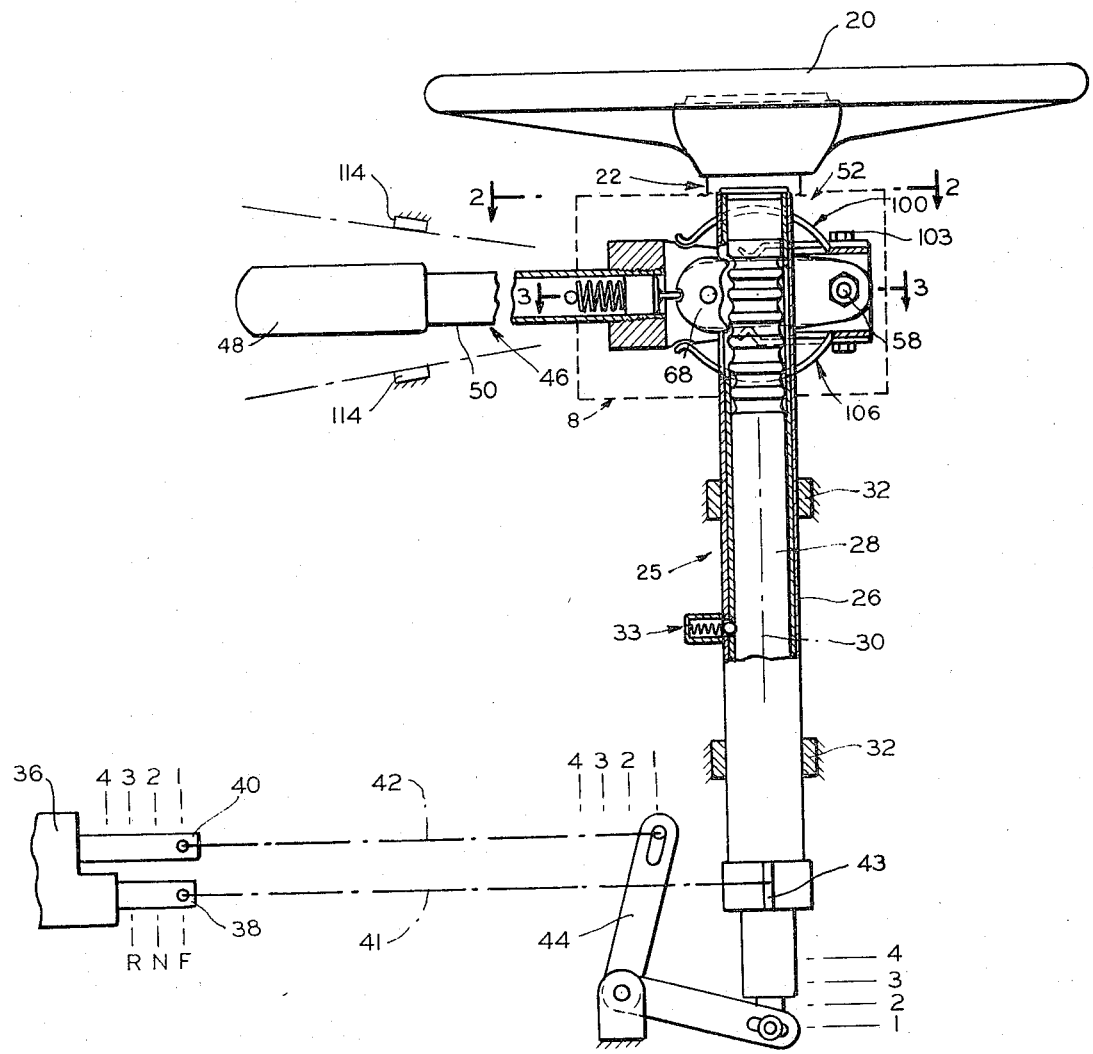
FIG. 1 is an axial sectional view of an arrangement including the principal components of the invention.

Referring in detail to the drawings, attention is directed first to FIG. 1 showing the main components of the overall construction of the device of the invention, and showing the significant elements thereof mounted in a steering and gear shifting column. The steering column is represented in FIG. 1 by a steering wheel 20, which is mounted on a shaft 22 shown in FIG. 2, on an axis 24. The steering column itself is conventional.

The transmission shifting mechanism, or control mechanism, includes a shifting column identified as a whole at 25, and incorporates as major components, an outer sleeve 26 and a center shaft 28, having a common axis 30 parallel with the axis 24 of the steering column. The shifting column may be mounted in any convenient location, but preferably on or adjacent to the steering column by means of brackets 32 (FIG. 1). The foregoing mounting arrangement is well known.

The sleeve 26 is mounted for oscillating or rotational movement, but against axial movement The center shaft 28 is mounted in the outer sleeve 26 for reciprocatory movement, along its longitudinal axis 30. Suitable detent means 33 may be provided for releasably retaining the center shaft in axially adjusted position in the outer sleeve. Since the shifting column 25 is arranged on the steering column, it is usually referred to as being in a vertical position, although that arrangement is not critical and it can also be referred to as an upright position. In further description of the components of the device, reference may be made to an "upper" and a "lower" position, it being understood that that arrangement is for convenience, but the same relationship would hold true if it were desired to have the steering column positioned in some other arrangement.

A transmission is shown at 36, which may be of conventional nature and has a first shifting valve 38 and a second shifting valve 40. The shifting valve 38 is for controlling the forward and reverse movements and is actuated by a linkage 41 by means of a radial arm 43 (FIG. 2) on the outer sleeve 26, i.e., upon rotational or oscillatory movement of the sleeve. On the other hand, the transmission 36 is controlled as to speed ratios through the valve member 40 by means of linkage 42 through a bell crank member 44 controlled by the center shaft 28.

The foregoing is conventional, that is to say upon rotational or oscillatory movement of the outer sleeve 26, the transmission is controlled as to forward and reverse, and upon reciprocatory movement of the center shaft 28, the latter acts through the bell crank 44, linkage 42 and transmission valve 40 for controlling the speed ratio of the transmission. Upon determination of the foregoing, the following has to do with the control movements of the outer sleeve and center shaft according to the desired condition movements in the transmission. In the assumed embodiment of the features of the invention four forward speeds are provided, but if desired there may be more or less than that number, in accordance with known constructions. As indicated above, the transmission 36 itself and the control valve members 38 and 40 and their operation are conventional. Similarly, the operation of the forward and reverse functions through the rotation of the sleeve 26, and the control of the speed ratio conditions through the reciprocation of the shaft 28, in themselves are known and detail description of them and their related functions are of course omitted. The construction of the device as described below, for producing those functions, constitutes the features of the present invention.

Referring to the other components of the construction, and relating particularly to the features of the present invention, attention is directed again to FIG. 1 which includes a single shifting lever or handle 46 which may have a hand grip 48 and a shank portion 50 preferably tubular in shape, mounted in a mounting means or base unit 52, which, as described in detail hereinbelow includes an arrangement for mounting the shifting lever on the shifting column for actuating and controlling both the outer sleeve and the center shaft.

The shifting lever base unit 52 is shown in detail in FIGS. 3–7, and includes a pair of opposed side plates 54 pivoted on an axis 56, by means of a bolt 58 running through the side plates and a cage 60 which serves as a pawl mounting means. The bolt 58 is on one side of the shifting column, and on the other side the side plates 54 are connected by means of a bolt 62 with a spacer or filler 64 therebetween. The shank 46 of the shifting lever is mounted as by threading it into the spacer 64.

The cage means or pawl supporting means 60 includes a pair of side plates 66 pivoted on the bolt 58. This pawl mounting means 60 mounts a pawl 68 to be referred to in detail hereinbelow, this mounting including a shaft or pin 70 in the side plates 66 on which the pawl is pivoted, the pawl being spaced therebetween by spacers 71. The spacers may be anchored to the side plates 66 as by welding as indicated at 73. Between the side plates 66 is an anchoring member 75, appropriately held in place centered by spacers 77, these spacers also being anchored to the side plates 66 as by welding at 79.

Figure 3:
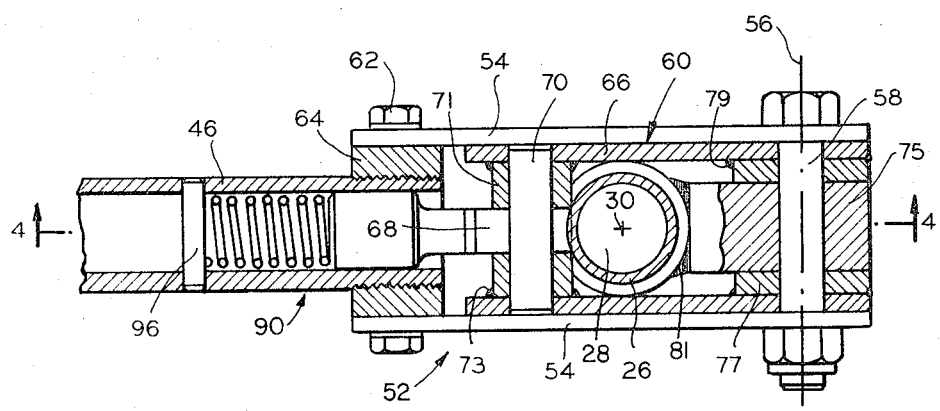
FIG. 3 is a large scale sectional view taken at line 3—3 of FIG. 1.

The mounting means as thus described specifically in connection with FIG. 3, shows the element 75 secured to the sleeve 26 as by welding as indicated at 81, this arrangement thereby mounting the complete mounting means 52 on the shifting column and specifically on the sleeve 26 against movement both axially and rotationally. The axial fixation secures the shifting lever in position along the shifting column, and the rotational fixation effects rotational or oscillatory movement of the outer sleeve 26 upon corresponding movement of the shifting lever.

In accordance with the above explanation, the shifting lever 46 is swingable about the axis 30 of the shifting column for forward and reverse shifting of the transmission, and the shifting lever is operative for shifting the center shaft axially of the outer sleeve in accordance with the corresponding shifting of the shifting lever, for speed ratio shifting. For convenience in the description of the device and in understanding the invention, reference is made to shifting of the shifting lever in a "first sense" and in a "second sense" the former relating to the forward and reverse functions and the latter referring to the speed ratio functions.

Referring again in detail to the mounting means 52, as described in connection with FIG. 3, attention is now directed to FIG. 4, and in comparison with FIG. 1, the center shaft 28 has a plurality of grooves or convolutions 72 divided by ribs 74, the grooves being seven in number in accordance with the arbitrary selection of four speed ratios incorporated in the transmission. These grooves 72 are positioned adjacent the upper end of the shaft 28, the shaft having an end abutment surface 76 which may engage a stop element 78 upon its being shifted sufficiently in that direction. Similarily, the shaft 28 is provided with a stop element 80 which may be in the form of a ring mounted in the shaft engageable with a suitable stop element 82, for limiting movement of the shaft in the opposite direction. The stop elements 78, 82 represent the extreme positions of movement of the shaft in the shifting operations with respect to the speed ratios.

Attention is now directed to the actuation of the pawl 68 and in its relation to the grooves 72, and for convenience the grooves 72 and the ribs 74 are herein referred to generically as a "ratchet" for convenience in description of the actuation of the pawl 68 in controlling the center shaft. The pawl 68 is best represented in FIG. 4, having pivotal mounting on the shaft 70 as referred to above, and having terminal elements 84*a* and 84*b* engageable respectively with the grooves 72 in the speed ratio shifting operation. The pawl 68 has a body portion 86 in which is formed a notch 88 centrally thereof on its "back side".

In the tubular shaft 50 (FIG. 4) of the shifting lever 46 is an over center device 90, including a slidable plunger 92 and a compression spring 94 compressed between the plunger 92 and a cross pin 96, the plunger having a stem 98 projecting into the notch 88.

In further description of the shifting lever mounting means or base unit 52, the outer plates 54 and the cage 60 are independently pivotal on the bolt 58, the outer plates being swingable directly by swinging the shifting lever 46, and the cage 60 being pivotal in response to the interaction between the pawl 68 and the over center device 90, although indirectly by the swinging or shifting movement of the shifting lever. A centering spring 100 is provided for biasing the cage 60 to center position, this spring means including (FIGS. 5 and 7) leaf spring elements 102 secured as to the member 75 by means 103 having extended ends 104 engaging the side plates 66 of the cage.

Figure 8:
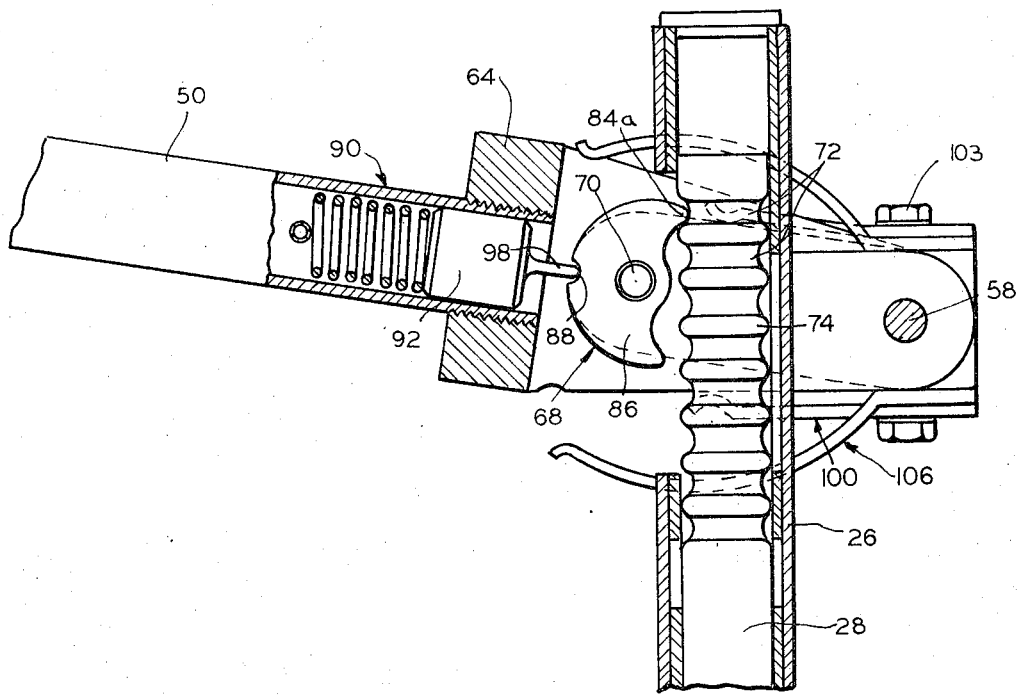
FIG. 8 is a large scale view of the portion outlined in dot-dash line in FIG. 1 and indicated at 8, showing certain components of the latter figure in a shifted position.

The spring means for centering the outer plates 54 is of similar construction, (FIGS. 6 and 7) identified generally at 106 and including opposed leaf spring elements 108 also secured by the means 103. The extended ends 110 of the leaf spring element 108 engage the side plates 54. Upon release of the moving forces, as produced by shifting the shifting lever, these springs return the corresponding components to center position shown in FIG. 1. Comparison may be made between FIG. 1 showing these components in center position and FIG. 8 showing them in an angled position.

Stop means 112 (FIG. 2) are provided for limiting shifting movement of the shifting lever in the first sense, or to forward and reverse, and stop means 114 (FIG. 1) are provided for limiting shifting movement of the shifting lever in the second sense, or shifting to speed ratio conditions.

It will be noted that the number of grooves 72 is greater than the number of speed ratios assumed, the latter being four, in order to accommodate both points or elements 84a and 84b of the pawl 68. This difference between the number of grooves and the number of speed ratios, or three, is in accommodation with the spacing between the points 84a and 84b of the pawl 68.

Figure 2:
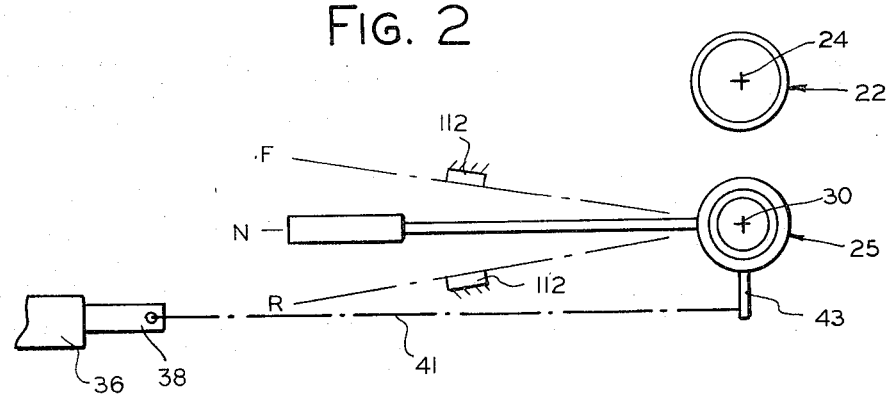
FIG. 2 is a view oriented according to line 2—2 of FIG. 1 but showing only certain elements therein, and those in diagrammatic manner.

The shifting lever 46 is assumed to have a center or neutral position relative to each the forward and reverse shifting operation, and the speed ratio shifting operation. FIG. 2 shows the shifting lever in such center position relative to the forward and reverse shifting operation, and FIG. 1 shows it in center position relative to the speed ratio shifting operation. In each case the shifting lever is movable only one increment in either direction, being limited by the stops 112 in the first case and the stops 114 in the second case as referred to, but it is to be pointed out that in the case of the stops 114 they respectively limit shifting movement of the lever in both upshifting and downshifting, as referred to again hereinbelow.

In the normal operation of the device, in shifting to forward or reverse a simple step is performed, i.e., the lever is shifted or swung about the axis 30 of the shifting column and the transmission 36 is shifted accordingly, the base unit 52 being fixed to the outer sleeve 26 as explained above. This simple movement in itself is known, but it is pointed out that both this shifting, and the speed ratio shifting, work in conjunction with each other.

Figure 4:
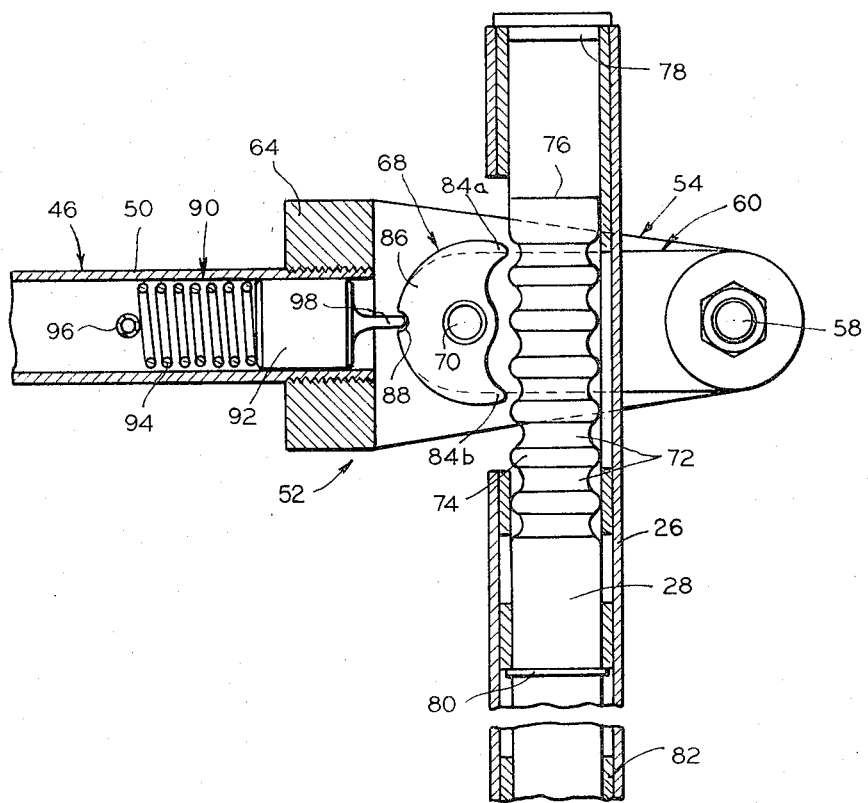
FIG. 4 is a view taken at line 4—4 of FIG. 3.
Figure 5:
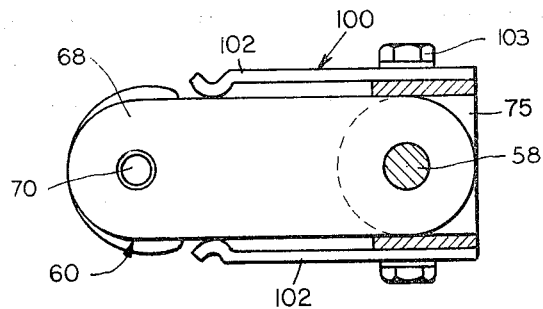
FIG. 5 is a detail view of a pawl holder included in FIG. 1 and oriented according to that figure.
Figure 6:
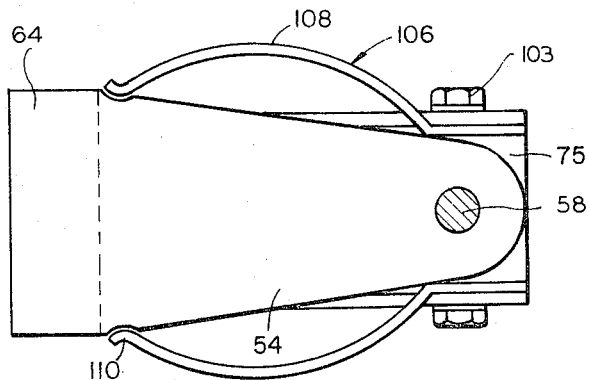
FIG. 6 is a view of a component of the shifting lever mounting means, associated with the component of FIG. 5, and oriented in the same direction as the latter figure.
Figure 7:
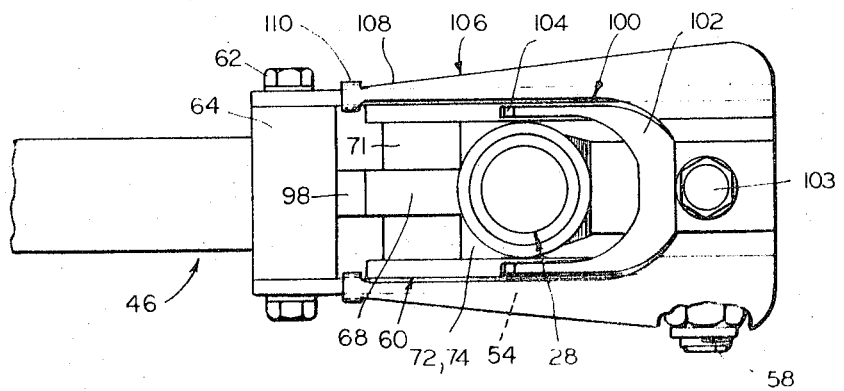
FIG. 7 is a side view, in elevation, as taken from either end of the construction of FIG. 3.

In speed ratio shifting, and referring to FIGS. 1 and 4, the center shaft 28 is shown in first speed position. To shift to the next speed, or No. 2 position, the shifting lever 46 is swung in corresponding direction, or "up" as oriented in FIG. 1. As the shifting lever is shifted, the stem 98 of the plunger 92 carries or swings the pawl 68 slightly in the same direction and then the over center device 90 abruptly swings the pawl angularly (FIG. 8) so that the point 84a enters into the first groove 72, and then as the shifting lever continues to move, it shifts the center shaft upwardly to the next position or to second drive position, and is limited in this movement by the corresponding stop 114 which corresponds with one speed ratio shifting increment. The shifting of the center shaft thus acts through the bell crank 44 and linkage 42 and actuates the valve 40 of the transmission. Thereupon the operator releases the shifting lever and he may move it back to center position, but it is biased to that position and actually moved there by the spring means 106, and as it is being moved to that position, the spring means 100 moves the cage 60 to center position which correspondingly returns the pawl 68 to its center or neutral position (FIG. 4). It will be understood also that as the side plates 54 are returning to center position, the stem 98 acting through the pawl, tends to carry the cage through its center position. The pawl and ratchet means, 68, 72, is thus automatically made active in response to shifting movement of the lever 46.

Then to shift to the next position, or third drive, the operator performs the same operation, namely, moves it upwardly (FIG. 1) and in this step, the point 84a of the pawl engages in the second groove and upon movement of the shifting lever shifts the center shaft 28 another like increment. This will continue to the limit of the movement of the center shaft 28, or in this case to four forward drives, and in this case again, and in all cases, the extent of shifting movement of the shifting lever is limited by the corresponding stop 114.

In downshifting, the same kind of movements are made, but the shifting lever is shifted downwardly (FIG. 1) and the extent of the shifting movement is limited by the lower stop 114.

Thus in accordance with the foregoing, the shifting lever can be shifted only an amount corresponding to a single speed ratio, and it is impossible therefore to skip speeds.

Regardless what position the shifting lever is in, in its first sense, i.e., whether forward, neutral, or reverse, the steps for shifting speed ratios can be made in any one of those positions, i.e., the base unit 52 being secured to the outer sleeve 26, it swings the outer sleeve, but there is no obstruction to shifting the shifting lever in its second sense. Similarly, regardless what speed ratio condition the transmission is in, the lever can be shifted in its first sense or between forward, neutral, and reverse.

If desired suitable indicating means may be mounted in a suitable location to indicate the position of the shift lever in each of its senses.

Figure 9:
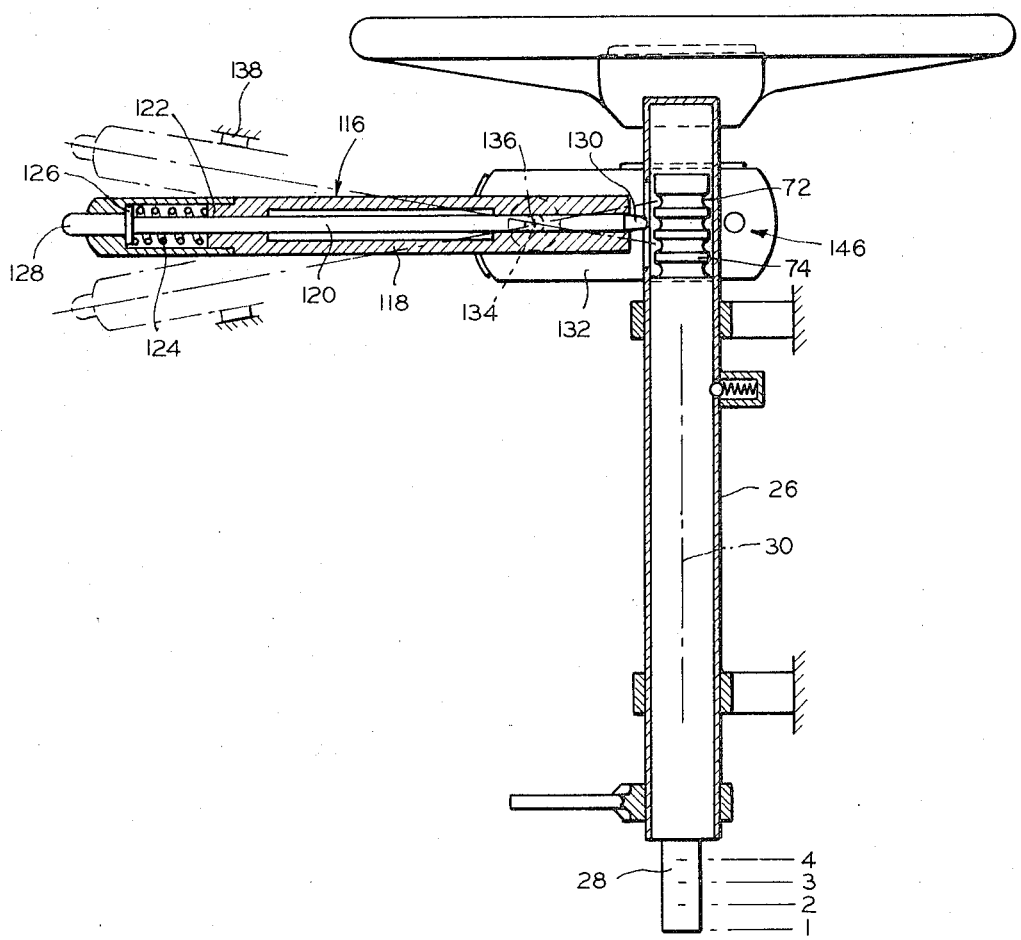
FIG. 9 represents a modified form of the device and is oriented according to FIG. 1.
Figure 10:
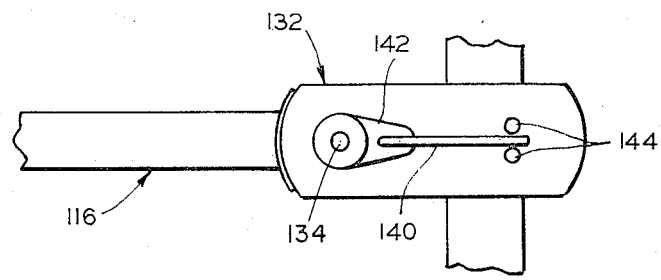
FIG. 10 is an elevational detail view of a component incorporated in the device of FIG. 9.

FIGS. 9 and 10 show the device described above, except that the pawl and ratchet means is manually actuated or controlled while in the former construction the pawl and ratchet means is automatically controlled. The present device is similar in overall construction to the above device in that it includes the outer sleeve 26 and the center shaft 28, the latter having grooves 72, but in this case there are only four grooves. The present device includes a shifting lever 116 including an outer sleeve 118 and a plunger 120 slidable therein. The outer sleeve has a shoulder 122 and a compression spring is interposed between that shoulder and a collar 126 on the plunger, biasing the plunger to a retracted position, to the left in FIG. 9. The plunger has an extended outer end portion 128 forming a manual pushbutton, and a nose 130 cooperable with the grooves 72.

The construction includes a shifting lever mounting means 132 which may be of any suitable construction such for example as a pair of opposed plates fixedly secured to the outer sleeve 26.

The shifting lever 116 is pivotally mounted at 134 in the mounting means 132 on an axis 136 perpendicular to the paper, and is shiftable about that axis for upshifting and downshifting to corresponding positions indicated in FIG. 9 as limited by stop means 138, as described in connection with the previous embodiment.

The shifting lever is mounted in the mounting means rigidly for shifting in the first sense, i.e., about the axis 30, and it is believed not necessary to describe such in connection with the present device. For upshifting, for example, the operator depresses the pushbutton 128 and moves the center shaft inwardly and the nose 130 engages in the corresponding groove 72 and upon swinging the lever, he shifts the lever as limited by the corresponding stop 138. This moves the center shaft an increment corresponding to one speed ratio and it can be moved only that amount. He then releases the pushbutton and the plunger 120 is retracted by the spring 124, removing the nose 130 from the groove. The lever may than be moved manually to center position, or by the centering spring means as shown in FIG. 10. The latter means includes a leaf spring 140 secured at one end to an arm 142 which in turn is secured to the shaft 134. The other end of the leaf spring, which is loose, is positioned between a pair of pins 144. These elements are located, for example, on the exterior of the mounting means 132. When the lever 116 is shifted either to up position or down position, the leaf spring 140 is flexed and bent, and upon release of the shifting lever, the spring 140 returns the lever to its neutral position.

If desired means of known kind may be mounted in a suitable position, such as indicated at 146 in FIG. 9 for indicating the shifting step in which the transmission is shifted.

Thus in the present construction, (FIGS. 9, 10) the shifting operation is limited to a single speed ratio and it is impossible to skip speeds since whenever the shifting lever is shifted an increment corresponding to one speed ratio, it must be returned to neutral position before another shifting operation can be performed. In downshifting the foregoing steps are performed except in the opposite direction and in each upshifting and downshifting it is impossible to skip speeds.

The device is operable as a power device, i.e., a jack; in the case of a conventional jack, the pawl is gravity operated to released position, while in the present case, it is spring biased to that position.

I claim:

1. Shifting mechanism for use with a transmission having
   a. forward, neutral and reverse conditions and a shift valve for controlling those conditions, and
   b. a plurality of speed ratio conditions and a shift valve for controlling those conditions,
   the combination comprising,
   a shifting column including an outer sleeve and a center shaft,
   means mounting the outer sleeve for oscillation but against axial movement, and linkage operatively connecting it with the (a) shift valve for actuating the latter in response to oscillation of the outer sleeve,
   means mounting the center shaft in the outer sleeve for axial reciprocation therein, and linkage operatively connecting it with the (b) shift valve for actuating the latter in response to reciprocation of the center shaft,
   a shifting lever, and means mounting it on the shifting column,
   the shifting lever being swingable in a first sense about the axis of the shifting column and operative, in response to swinging movement in that sense and acting through its own mounting means, for oscillating the outer sleeve,
   the shifting lever also being movable in a second sense in a plane containing the axis of the shifting column, from a center position in actuating direction,
   means forming releasable interconnection between the shifting lever and the center shaft for reciprocating the center shaft in response to moving the shifting lever in its said second sense,
   means limiting movement of the shifting lever in its said second sense from said center position in actuating direction an amount corresponding to movement of the (b) shift valve between consecutive and adjacent speed ratios, and
   means operative for releasing the connection between the shifting lever and the center shaft in moving the shifting lever in return to its center position.

2. A device according to claim 1 and including pawl and ratchet means operatively interposed between the shifting lever and the center shaft, operative for shifting the center shaft pursuant to shifting movements of the shifting lever, and wherein the pawl has a normal retracted position separated from the ratchet, and the mounting means includes means for moving the pawl into active position relative to the ratchet, and the shifting lever being thereby operative for moving the center shaft in shifting direction.

3. A device according to claim 1 wherein the means mounting the shifting lever includes a unit fixedly secured to the outer sleeve, the shifting lever is operatively mounted in the unit for positive movement of the unit, and thus the outer sleeve, in directions about the longitudinal axis of the sleeve,
   and the lever is mounted in the unit for pivotal swinging movement in a plain containing that axis constituting shifting in second sense.

4. A device according to claim 1 and including stop means limiting movement of the shifting lever, in a single shifting movement, an amount corresponding to movement of the (b) shift valve between consecutive and adjacent speed ratios, whereby pursuant to release of the connection between the shifting lever and center shaft in return of the shifting lever to its center position, the connection is re-established upon movement of the shifting lever again in actuating direction.

5. A device according to claim 4 and including means accommodating movement of the shifting lever in its said second sense in either direction for correspondingly effecting upshifting and downshifting.

6. A device according to claim 4 and including yielding centering means for biasing the shifting lever to center position upon release of the force moving it in actuating direction.

7. A device according to claim 1 and including means biasing the pawl out of operative position with the ratchet,
   and also including means operative in response to movement of the shifting lever in actuating direction for automatically moving the pawl into operative engagement with the ratchet.

8. A device according to 7 and including centering means biasing the shifting lever to a center position and operative for so moving it upon release of force moving it in actuating direction, and pursuant to movement of the lever to center position, the means biasing the pawl out of operative engagement with the ratchet becomes operative, and constitutes the means for releasing the connection between the pawl and the ratchet.

9. Shifting mechanism for use with a transmission having
   a. forward, neutral and reverse conditions and shift valve for controlling those conditions, and
   b. a plurality of speed conditions and a shift valve for controlling those conditions,
   the combination comprising,
   a shifting column having a main axis and including an outer sleeve and center shaft, means mounting the outer sleeve for oscillation but against axial movement, and linkage operatively connecting it with the (a) shift valve for actuating the latter in response to oscillation of the outer sleeve,
   means mounting the center shaft in the outer sleeve for axial reciprocation therein, and linkage operatively connecting it with the (b) shift valve for actuating the latter in response to reciprocation of the center shaft, a shifting lever and means mounting it on the shifting column, the means mounting the shifting lever including a base unit incorporating a central element fixedly secured to the outer sleeve, a first component pivotally mounted on said central element on a second axis transverse to the main axis of the shifting column, and a second component mounted on the same second axis,
   the center shaft having ratchet means adjacent said base unit,
   said shifting lever being rigidly mounted in said first component,
   a pawl pivotally mounted in said second component and having opposed points spaced apart along the main axis of the shiftcolumn,
   means yieldingly biasing the first component, with the shifting lever, and the second component to a center position wherein the pawl is out of operative engagement with the ratchet, and over center means in the first component operatively engaging the pawl and operative in response to pivoting movement of the first component about said second axis for pivotally moving the pawl whereby the corresponding point of the latter engages the ratchet and pursuant to further corresponding pivoting movement of the first component shifts the center shaft in the outer sleeve,
   said shifting lever being operative in response to swinging movement about said main axis for oscillating said outer sleeve.

10. A device according to claim 9 wherein said over center device includes a plunger in the first component and means yieldingly biasing it into engagement with the pawl,
   the plunger being operative in response to initial swinging movement of the first component for tripping the pawl over center and when the pawl is in such over center position the plunger biasing means operates to swing the pawl in corresponding direction so that the corresponding point of the pawl engages the ratchet.

11. A device according to claim 9 wherein the centering means includes a first spring means biasing the first component to center position and a second spring means biasing the second component to center position.

12. A device according th claim 11 wherein each the first and second spring means includes opposed leaf spring elements on opposite sides of the corresponding component for biasing the components to their center position from either of opposite shifted positions corresponding to upshifting and downshifting.

13. A device according to claim 9 wherein the pawl has a notch in its side opposite its said opposed points, and the plunger of the over center device has a stem engaging in said notch and the over center device is thereby operative, pursuant to shifting movement of the shifting lever in its second sense for pivoting the pawl beyond the center position whereupon the over center device acting lingitudinally of the shifting lever is operative for abruptly moving the pawl into engagement with the ratchet.

14. A device according to claim 1 wherein the pawl is included in a plunger in the shifting lever, the plunger having an inner end engageable with the ratchet and an outer end exposed at the opposite end of the shifting lever for manual actuation, and including means biasing the plunger to an outer retracted position with the pawl out of engagement with the ratchet.

15. A device according to claim 14 wherein the means mounting the shifting lever on the shifting column includes a unitary base unit fixedly mounted on the outer sleeve,
   the shifting lever is mounted in the base unit in fixed position relative to swinging movement about the axis of the shifting column, but pivoted in the base unit for swinging movement in a plane containing the axis of the shifting column.

16. A device according to claim 15 including single means mounted on the base unit operative for yieldingly biasing the shifting lever to center position from an active position.

17. A device according to claim 16 wherein the biasing means includes a leaf spring having one end connected with the shifting lever and its other end detached and disposed between a pair of stop elements fixedly mounted on the base unit.

18. A device according to claim 13 wherein the ratchet includes a plurality of grooves engageable by the points of the pawl,
   the points of the pawl are spaced apart a distance equal to a plurality of such grooves,
   the grooves are greater in number than the gear ratio positions, and of such number that one of the points of the pawl can engage in successive grooves and, in response to movement of the shifting lever in a first direction, move the center shaft in a corresponding first direction a number of steps equal to the gear ration positions, and at the end of such steps of movement, one of the grooves is positioned for engagement by the other of the points of the pawl, in response to movement of the shifting lever in the opposite direction, and the pawl is operative for moving the center shaft in steps in the corresponding opposite direction.

* * * * *